United States Patent [19]
Suzuki et al.

[11] 3,924,091
[45] Dec. 2, 1975

[54] WELDING METHOD AND MATERIALS

[75] Inventors: Haruyoshi Suzuki, Seki; Thuyoshi Takino, Yachio; Naomichi Mori, Machida; Isao Sugioka, Funabashi; Osamu Matsuda, Narashino; Shozo Sekino, Kitakyushu; Hiroyuki Honma, Utsunomiya, all of Japan

[73] Assignees: Nippon Steel Corporation; Nippon Steel Welding Products Engineering Co., Ltd., both of Tokyo, Japan

[22] Filed: Sept. 14, 1973

[21] Appl. No.: 397,329

Related U.S. Application Data

[63] Continuation-in-part of Ser. No. 169,915, Aug. 9, 1971, abandoned.

[30] Foreign Application Priority Data

Sept. 29, 1970 Japan.............................. 45-84613
Aug. 14, 1970 Japan.............................. 45-75575
Dec. 10, 1970 Japan............................. 45-109847

[52] U.S. Cl................... 219/73; 219/146; 117/205
[51] Int. Cl.............................................. B23K 9/18
[58] Field of Search ............ 219/73, 146, 145, 137; 117/202, 203, 204, 205, 206; 148/24, 26

[56] References Cited
UNITED STATES PATENTS

| | | | |
|---|---|---|---|
| 2,875,104 | 2/1959 | Bergh et al. | 219/146 |
| 3,342,974 | 9/1967 | Wallner | 219/146 |
| 3,513,289 | 5/1970 | Blake et al. | 219/146 |
| 3,539,765 | 11/1970 | Duttera et al. | 219/146 |
| 3,566,073 | 2/1971 | Black | 219/146 |
| 3,745,294 | 7/1973 | Anikawa et al. | 219/73 |
| 3,767,888 | 10/1973 | Sullivan | 219/146 |
| 3,769,491 | 10/1973 | De Long et al. | 219/137 |

*Primary Examiner*—J. V. Truhe
*Assistant Examiner*—G. R. Peterson
*Attorney, Agent, or Firm*—Toren, McGeady and Stanger

[57] ABSTRACT

Methods and materials for submerged arc welding for obtaining a high toughness welded metal containing titanium and boron by using a flux cored wire composed of a steel sheath and a core containing titanium and boron with the addition of a metal fluoride.

3 Claims, 7 Drawing Figures

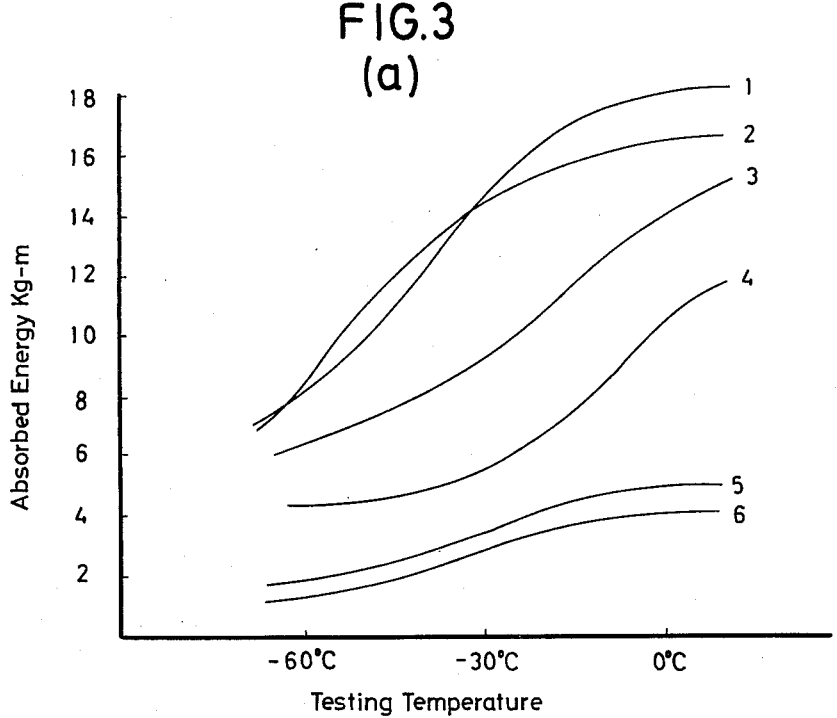
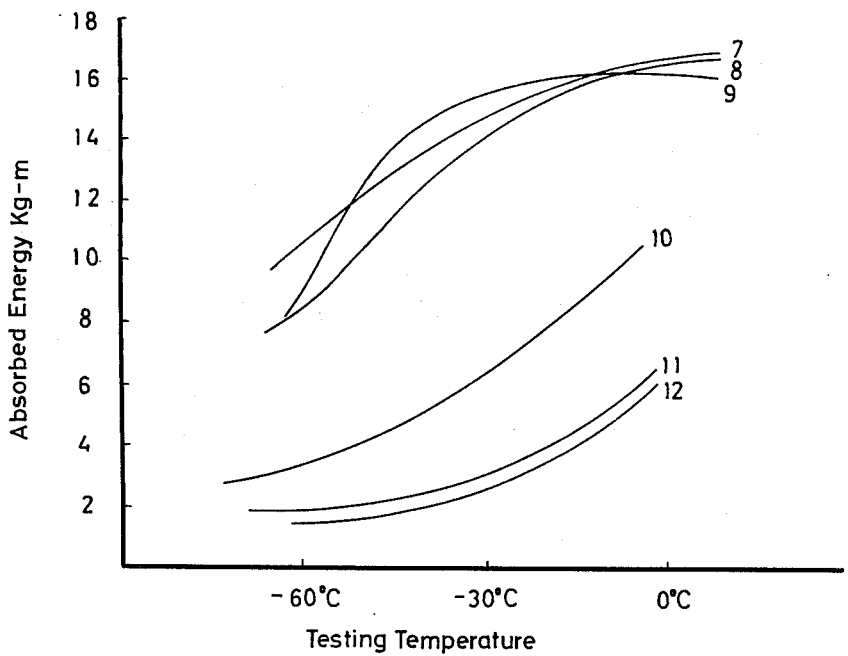

(a)

(b)

WELDING METHOD AND MATERIALS

CROSS REFERENCES TO RELATED APPLICATIONS

This application is a continuation-in-part of copending application Ser. No. 169,915, filed Aug. 9, 1971, now abandoned, the contents of which are incorporated herein by reference.

BACKGROUND OF THE INVENTION

1. Field of the Invention

The present invention relates to methods and materials for submerged arc welding for obtaining a high toughness welded metal containing titanium and boron by using a flux cored wire containing titanium and boron with the addition of a metal flouride.

This invention also relates to a method of submerged arc welding to obtain a welded metal with high toughness by one layer welding on both sides or a small layer heap welding, as well as welding materials and a filled-up wire for the submerged arc welding use thereof.

2. Description of the Prior Art

For the welded part of a steel for low temperature use, such as, aluminum refined killed steel and 2.5 Ni-steel used for LPG freighter and other uses, the low-temperature impact value at about −60°C is an important property. These steel sheets are usually used with a thickness of about 6–20 mm, and in order to join flat plates to one another, it is desirable to adopt an automatic submerged arc welding to increase the welding efficiency. However, with the conventional combination of a submerged arc flux and wire, satisfactory low-temperature impact value cannot be obtained with a high efficiency welding method, e.g. submerged arc welding, i.e. welding with a relatively large electric current (or heat imput) or one layer welding on both sides. A welded metal with high toughness can only be obtained by lowering the heat input or by a large heap welding at the sacrifice of the efficiency.

Various attempts have been made to increase the impact value of the welded metal by a single layer or one layer on both sides submerged arc welding. It has been considered in general that a welded metal with high toughness can be obtained when the $O_2$ content (oxide inclusions) in the welded metal is reduced by increasing the basicity of the flux or when an alloy element, such as, Ni and Mo is added. Typically, up to 3.5% by weight Ni and up to 0.8% by weight Mo are added.

However, when a highly basic submerged arc flux is used, there is a tendency to increase the grain size of the territe crystals in the microscopic structure of the welded metal, resulting in the degradation of the impact value as compared with the case when a neutral submerged arc flux is used.

On the other hand, although it is well known that the impact value of the welded metal by a single layer— or a small layer heap welding can be increased by using a neutral submerged arc flux containing a large amount of metal fluoride such as $CaF_2$, it is difficult to obtain a sufficiently high impact value, for instance NK standard value (K5 TAW5, more than 35 kg-m) at a low temperature of about −60°C.

SUMMARY OF THE INVENTION

One of the objects of this invention is to offer a flux cored wire for submerged arc welding in which a fluoride or metal having a low vapor pressure is added together with titanium and boron. The essential point thereof is a flux cored wire for submerged arc welding in which $CaF_2$, which shows a vapor pressure of 1 atmospheric pressure at 2500°C, other fluorides more volatile, such as, NaF, LiF, KF, $MgF_2$, $MnF_2$, $K_2ZrF_6$, $Na_2ZrF_6$, $K_2TiF_6$ and $Na_2TiF_6$.

Particularly the flux cored wire of the present invention is composed of a hollow mild steel sheath having a core composed of about 0.04 to 1.0% titanium, about 0.002 to 0.05% boron and about 4 to 25% of a fluoride selected from the group consisting of $CaF_2$, $NaF_2$, KF, $LiF_2$, $MgF_2$, and $MnF_2$, all percentages being by weight based on the total weight of the electrode, the balance of the weight of the electrode being the steel sheath.

The present invention also comprises a method for submerged arc welding to obtain a weld having a high toughness by using a submerged arc welding flux having a basicity (as defined hereinafter) in the range from about 0.90 to 1.30, in conjunction with the above defined flux cored wire.

When such a fluoride with high vapor pressure is added in the wire, a wide space in the arc void is sealed with the vapor thereof, the oxidation and nitrogenation of titanium is prevented, the amount of MnO and manganese silicate which have an influence on the decrease of the amount of $O_2$ and particularly on the deterioration of the toughness are diminished remarkably, and the oxidation and nitrogenation of boron is also diminished. Thus, it is possible to maximize the effect of the coexistence of titanium and boron on the improvement of the hardenability.

BRIEF DESCRIPTION OF THE DRAWINGS

FIG. 3(a) and (b) are the graphs showing the transition curve of the examples of this invention and of the comparison examples.

DESCRIPTION OF THE PREFERRED EMBODIMENT

Figure 1:
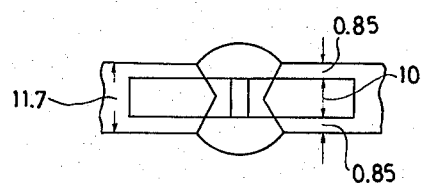
FIG. 1 is an explanatory drawing showing the position where the impact test piece is taken.

It is well known that the toughness of welded metal changes remarkably not only by the compositions of the master steel sheet and the welding materials, which determine the composition of the welded metal, but also by the composition of the flux.

Generally speaking, when the basicity of the flux is high, while $O_2$ content in the welded metal is diminished and the toughness is improved, defects are encountered, e.g. the peeling of the slag becomes difficult, the appearance of the bead is worse and the workability becomes inferior, for instance, the undercut is formed easily.

Moreover, when the basicity is high, $H_2$ content in the welded metal is increased, which can produce pits, blowholes and weld cracks.

As for the method of submerged arc welding to obtain a welded metal with high toughness without losing the workability, it is advantageous to carry out the welding by combining a flux cored wire in which a flux agent is filled in the hoop material with a submerged flux. The reason is as follows: since the flux cored wire is exposed to an arc atmosphere at very high temperature, the chemical reaction expected to occur between the flux and the molten steel reaches equilibrium in a very short period, and consequently the influence of the flux charged in the edges becomes secondary; thus, while the basicity of the slag, as seen as a whole, is relatively low, it is possible to obtain nevertheless a welded metal with high toughness.

It is a further merit of using flux cored wire that a tolerable amount of alloy component can be added in the hoop as a cored material, and more advantageously a sufficient amount of deoxidizing and denitrogenizing agent can directly be added. In using a solid wire, the addition of alloy components, deoxidizing and denitrogenizing agents, etc., is restricted owing to the problem occurring in melting and in hot rolling.

As a result of various investigations on the controlling factors on the toughness of welded metal in the welding of 50–80 kg/mm² class high tension steel and of steels for low temperature use, the present inventors found that the influence of proeutectoid ferrite formed along the $\gamma$-grain boundary on the fracture transition temperature ($_vT_{rs}$) is very great, while the influence of cleanliness, particularly MnO in the inclusion determines the vE shelf energy. The reason why proeutectoid ferrite deteriorates the toughness is due to the facts that, when proeutectoid ferrite deposits, high carbon bainite or acicular high carbon martensite is formed around it, and as they are brittle, they become the origin or the propagation path of the formation of cracks, and since the proeutectoid ferrite crystals are large, cracks propagate through the grains at once.

Therefore, in order to improve the toughness of welded metal, it is advisable to prevent the formation of proeutectoid ferrite by elevating the hardenability.

However, it is undesirable to elevate the hardenability by increasing the carbon equivalent, because the strength becomes too high, causing an unbalance in strength with the master steel and forming cracks.

Boron is effective to improve the hardenability (to retard the deposition of proeutectoid ferrite) without increasing the strength excessively. While only a small amount of boron is effective, it is necessary that it is segregated along $\gamma$-grain boundary during $\gamma \rightarrow \alpha$ transformation. Boron has no effect when it is dispersed in $\gamma$-grains as a nitride or oxide. Therefore, it is necessary to protect the boron from nitrogenation and oxidation.

For this purpose, the addition of an element having a strong affinity with oxygen and nitrogen, such as, Al, Ti and Zr is necessary.

By investigating by experiments the influence of each of these elements, it has been proved that boron alone is insufficient, the effect of Al + B and Zr + B has entirely no effect, and Ti + B is most effective.

Why Ti is effective while Zr has not effect may be due to the reasons that Ti is more slowly consumed by oxidation than Zr, The solubility of Ti in iron is large, easily forming a solid solution as the $\gamma$-phase, and Ti itself can improve the hardenability, while Zr is very easily consumed by oxidation, has a low solubility in iron, forming almost no solid solution as the $\gamma$-phase, and thus does not increase the hardenability.

When Ti alone is added in the flux cored wire, Ti is oxidized out in passing the arc void, and the effect of improving the hardenability as in the coexistence with boron cannot be expected. It is important to protect Ti from oxidation and nitrogenation and to let the Ti reach the melting pond by evaporating volatile metals, e.g., fluorides or chlorides in the arc void to expel oxygen and nitrogen in the air or which come from the flux, and which invade into the arc void under ordinary conditions.

Although the idea of using a vapor of fluoride for sealing is similar to the case of the flux cored wire for use in open arc (nongaseous arc) welding, as compared with the case of open arc welding in which the arc is exposed to open air and the sealing effect is very insufficient, the use submerged arc welding, in which the sealing effect is complete and the Ti can be protected effectively, has great merit.

When Ti reaches the melting pond without suffering oxidation and nitrogenation, Ti forms oxides and other components prior to the Mn and Si at the surface of the melting pond facing the arc void, and migrates to the slag layer, and consequently the oxygen content in the molten steel is lowered, $SiO_2$ and MnO components in the inclusion are diminished, and the cleanness is improved. Moreover, by the synergistic effect with boron, the effect of Ti is doubled.

Another object of the present invention is to offer a method of submerged arc welding to obtain a welded metal with high toughness characterized in which a flux with nearly neutral composition, whose basicity $b$ expressed by the Formula ($b$) shown hereinafter lies in the range 0.90–1.30, is used as a submerged arc flux and a flux cored wire containing one or more than one component selected from a slag-forming agent, an arc stabilizer, a deoxidizer or denitrifier, alloy elements and iron powder as a cored material is used as a submerged arc wire are used in combination. It is a necessary condition for the wire that the contents of metal fluorides, Ti and B in the cored material to the total weight of the wire are respectively in the range mentioned below.

Contents of metal fluoride, Ti and B in the flux cored wire:

| | |
|---|---:|
| Metal fluoride ($CaF_2$, NaF, $MgF_2$, etc.) | .4 – 25% |
| Ti | 0.04 – 1.0% |
| B | 0.002 – 0.5% |

$$\text{Basicity } b = \frac{CaO+MgO+BaO+Na_2O+K_2O+Li_2O+CaF_2+\frac{1}{2}(MnO+FeO)}{SiO_2+\frac{1}{2}(Al_2O_3+TiO_2+ZrO_2)} \text{(wt.\%)}$$

Formula (1)

Said submerged arc flux may naturally contain minute amounts of oxide and other compounds as impurities besides the components in Formula (1).

In Formula (1), $CaF_2$ is calculated as a basic component. This is because fluoride serves to reduce practically the contents of $O_2$ and S in the deposit, and may be considered to have an effect similar to the basic components CaO, MgO, etc.

Only when the above mentioned conditions are satisfied, can a welded metal with high toughness be obtained without or with the addition of only a small amount of such elements as Mo and Ni, which are generally considered to be effective for the improvement of the toughness.

Particularly, it becomes possible to obtain a welded metal with high low-temperature impact value without the addition of Mo, which is added generally to obtain a welded metal with high toughness in a single layer— or a small layer heap welding.

One characteristic of this invention is to combine a submerged arc flux with a neutral composition, having excellent welding workability, with a flux cored wire containing $CaF_2$.

A highly basic flux generally is disadvantageous since its welding workability (the resitance against pit formation and the appearance of bead) is inferior, and the range of the welding condition is very limited. On the other hand, as a neutral flux is used in this invention, its welding workability is excellent, and this invention gives a welded metal with a better impact value than in the case when a filled-up flux wire containing B and Ti at the same time is combined with a highly basic flux.

The reason may closely relate to the fact that the $N_2$ content in the welded metal is reduced more by using a neutral flux than in the case when highly basic flux is used, and it seems that the effect of B and Ti in reducing the $N_2$ content is particularly remarkable in the combination of a neutral flux with a wire containing $CaF_2$.

When the submerged arc flux becomes acidic in the range such that its basicity is lower than 0.9, the $O_2$ content in the welded metal becomes high and the addition of B and Ti has no particular effect on the improvement of the impact value. When its basicity becomes greater than 1.30, the workability becomes worse as above mentioned, for instance, the tendency of pit formation is observed.

An important characteristic of the present invention is the use of a filled-up wire. The addition of $CaF_2$ in the submerged arc flux is generally very difficult, because the addition makes the welding workability inferior. On the other hand, the addition of $CaF_2$ in the wire has no serious influence on the welding workability. Moreover, the addition of B in the wire is the most suitable method for the addition of B in the welded metal.

Namely, in order to add a suitable amount of B in the welded metal, considerable B is lost during the reaction at the arc and in the melting pond, and its remaining percentage in the welded metal becomes fairly low. Therefore, to supply B in a solid wire, a fairly large amount of B should be added in the wire.

It has well been known that, when more than 0.01% of B is added in the solid wire, the working becomes difficult in the wire drawing and particularly in the hot rolling.

By the use of a filled-up wire, however, it is possible to add a definite amount of B easily in the form of pellet or powder as an alloy element in the filling material. Its merit is obvious.

As Ti and B in the wire are consumed by oxidation, nitrification, etc. during welding, the lower limits of B and Ti contents are respectively 0.4% and 0.002%. Below these limits, almost none will remain in the welded metal, and no improvement in the impact value can be observed. While up to about 1.0% of Ti improves the impact value, the addition of more than this value increases the hardness of the welded metal and has a tendency to decrease the impact value. When more than 0.05% of B is added, the welded metal contains more than about 0.01% of B, decreasing the impact value and at the same time forming heat cracks. Accordingly, 0.04–1.0% of Ti and 0.002–0.05% of B are the effective ranges.

As for the amounts of metal fluoride ($CaF_2$, NaF, $MgF_2$, etc.) to be added to the flux cored wire, below 4% has no distinct effect and the addition of more than 25% injures the arc stability and makes the welding impossible.

To add Ti and B at the same time in the flux cored wire is another characteristic of this invention. After various experiments, it was ascertained that, in the submerged arc welding, the synergistic effect can not be obtained in the combination Ti — Zr, Ti— Al, Ti — V, B — Zr, B — Al, B — V and others.

It is found further that the addition of such elements as Al, V and Nb together with Ti and B improves the impact value still more.

As above mentioned, it is characteristic of this invention that a welded metal with high toughness can only be obtained when a submerged arc flux with a neutral composition, whose basicity $b$ lies in the range 0.90–1.30, is combined with a filled-up wire, in which it is a necessary condition that metal fluoride, such as, $CaF_2$, Ti and B are contained at the same time in the range as above mentioned. When any of these conditions is lacking, a satisfactory result cannot be obtained.

To compare the microstructure of the welded metal of this invention with that of other welded metals, it is observed that proeutectoid ferrites at the austenite grain boundary diminish remarkably, and ferrite crystals in the grain become very fine. This property may be the reason why high toughness can be obtained. In the welded metals without the scope of this invention, coarse proeutectoid ferrites at the grain boundary or acicular ferrites are observed, and the toughness is low.

It is considered that the reason why proeutectoid ferrites diminish remarkably and ferrite crystals in the grain become very fine when Ti and B are added at the same time, the submerged arc flux is neutral, and a suitable amount of metal fluoride is contained in the wire, is due first of all to the existing state of boron in the welded metal, i.e., whether or not B exists as a solid solution, and that boron in the solid solution controls the formation of ferrite nuclei at the transformation of austenite. The formation of ferrite nuclei may be controlled still more in this invention as the $N_2$ content is reduced by the use of a neutral flux, the $O_2$ content is reduced by the addition of $CaF_2$, and Ti is present. Thus, the present invention provides various necessary conditions effective for the formation of fine ferrite crystals. Further, as a method to accomplish this object, it is a necessary condition that the submerged arc wire is a filled-up wire.

This invention is advantageous to obtain a submerged arc welding material suitable for the range of Nb–V (giving high impact toughness).

In welding a steel containing NB (V) by the use of conventional submerged arc welding material, the impact toughness values of the welded metal becomes considerably low as compared with the case of usual steel containing no Nb (V). On the other hand, the welding material of this invention produces a welded metal with a rather high toughness in the case of Nb (V) steel.

Particularly, the material of this invention exhibits its feature when Nb (V) steel is welded by a single layer— or a small heap welding.

The following examples illustrate the present invention:

EXAMPLE 1

In this example, a 50 kg/mm² class Si-Mn steel with the components as shown in Table 1 was used as a master steel.

A V-shaped ditch was cut in the steel sheet, a submerged arc flux containing $SiO_2$, CaO, MnO and others as shown in Table 2 was sprinkled therein, and welded on both sides by using a flux cored wire. Charpy test was made for the welded metal obtained.

The weight of hoop material in the total weight of the flux cored wire was about 75–80%, the remainder being the filling material. The rates of cored materials were as shown in Table 3. Wires A and B contain $CaF_2$, and C, D and E contain respectively LiF, NaF and Ca—Si. F is a standard wire containing no special additive.

Analytical results of oxygen, nitrogen, inclusion and soluble Ti, cleanliness, and mechanical properties — $_vT_{rs}$, $_vE$-40, (absorbed energy at −40°C in a 2 mm V-notch Charpy Impact Test), $_vE$ shelf (shelf energy in 2 mm V-notch Charpy Impact Test) and Ts (tensile strength) of the welded metal obtained in the welding with the use of a filled-up wire are shown in Table 4.

Table 1

| Chemical components in the master sheet (%) | | | | |
| --- | --- | --- | --- | --- |
| C | Si | Mn | Ni | Al |
| 0.08 | 0.27 | 1.28 | 0.01 | 0.023 |

Table 2

| Composition of flux for submerged are welding (%) | | | | |
| --- | --- | --- | --- | --- |
| $SiO_2$ | CaO | MnO | $CaF_2$ | Others |
| 42 | 17 | 20 | 8 | balance | clusions, and a low content of Ti. To examine the structure thereof, a large quantity of proeutectoid ferrite was observed. The toughness is worse due to two points: the amount of inclusions and the decreased hardenability. By adding $CaF_2$, the oxygen content decreases, the amount of remaining Ti is increased, and the toughness is improved remarkably.

When more volatile LiF or NaF is added instead of $CaF_2$, while the remaining rate of Ti is only slightly improved, the oxygen content is reduced still more. As a result, as compared with the case of $CaF_2$, the toughness of the welded metal together with $_vT_{rs}$ and $_vE_{shelf}$ is improved still more.

Table 4

| | Analytical result, cleanness and mechanical properties(%) | | | | | | | | |
| --- | --- | --- | --- | --- | --- | --- | --- | --- | --- |
| | Analytical Result | | | | Clean- | (°C) | Mechanical Properties (kg-m) | (kg-m) | (kg/mm²) |
| | O | N | MnO | sol Tl | ness(%) | $_rT_{rs}$ | $_vE$-40 | $_vE_{shelf}$ | Ts |
| A | 0.040 | 0.0074 | 0.033 | 0.024 | 0.133 | −30 | 5.2 | 15 | 53.8 |
| B | 0.058 | 0.0075 | 0.051 | 0.020 | 0.156 | −15 | 2.0 | 9 | 54.0 |
| C | 0.040 | 0.0070 | 0.026 | 0.024 | 0.121 | −27 | 4.3 | 16 | 53.2 |
| D | 0.035 | 0.0068 | 0.024 | 0.028 | 0.110 | −36 | 6.8 | 20 | 53.0 |
| E | 0.083 | 0.0052 | 0.084 | 0.005 | 0.340 | 20 | 1.3 | 7 | 53.2 |

In the case of the filled-up wire containing Ca—Si, while the oxygen content decreases, the cleanness and MnO decreases slightly, and the improvement of toughness is not as remarkable as in the case of the addition of LiF or NaF. In may be considered that, while the sealing effect of Ca is exhibited, the effect is reduced by the harmful influence of Si and $SiO_2$. Therefore, it is obvious that the toughness may be improved still more by using Ca metal or a Ca alloy such as Ca—Fe and Ca—Ni.

Additionally, a wire containing only fluoride, such as, $CaF_2$, $MgF_2$, NaF and LiF without the addition of Ti has almost no effect in improving the toughness, because the deoxidizing effect of Ti cannot be expected, and therefore the MnO and Mn silicate contents are not substantially decreased, and also the effect of improving the hardenability by the synergistic action of Ti and B does not come into play.

In conclusion, it is understood that to seal the arc atmosphere from open air effectively and, at the same time, to use Ti and B simultaneously is the decisive factor to improve the toughness.

Since such a synergistic action of Ti and B as mentioned above is exhibited originally for a welded metal with insufficient hardenability, the effect of this invention is particularly eminent when the composition of the welded metal lies in the range as follows: C: 0.03–0.15%, Si: 0.1–0.6%, Mn: 0.5–2.2, Cr: 0–1.0%, Ni: 0–3.5%, and Mo: 0–0.8%, and contains one or more of Al, V and Nb, in an amount less than 0.08% in total.

It should be noted that the sectional shape of the flux cored wire and the amount of cored material in the flux cored wire has no influence in this invention. It goes

Table 3

| | Rate of filling materials in the filled-up wire (%)* | | | | | | | | | |
| --- | --- | --- | --- | --- | --- | --- | --- | --- | --- | --- |
| | Mo | Ti | B | $CaF_2$ | NaF | Ca-Si | Iron Powder | Ni Powder | Mn Powder | Fe-Si Powder | LiF |
| A | 0.3 | 0.2 | 0.005 | 10 | — | — | 10 | 2.5 | 1.5 | 0.2 | — |
| B | " | " | " | 5 | — | — | 5 | " | " | " | — |
| C | " | " | " | — | — | — | 6 | " | " | " | 5 |
| D | " | " | " | — | 5 | — | 6 | " | " | " | — |
| E | " | " | " | — | — | — | 25 | " | " | " | — |

*Balance - Carbon Steel Sheath

As it is clear from the results, in the case of filled-up wire F containing no special additive, such as, fluoride, the welded metal has high contents of oxygen and inwithout saying that, besides the necessary components to constitute the invention, such as, various fluorides, composite fluorides, Ti and B, such supplementary agents as an arc stabilizer comprising various oxides and carbonates, a slag-forming agent, a deoxidizer comprising Fe—Si, Fe—Mn and others, an alloying element and iron powder can be added as a filling material.

The compositions of the submerged arc flux were as shown in Table 7, and those of the submerged arc wire were as in Table 8. Four samples of flux and eight samples of wire were tested under various combinations. Eight combinations, submerged arc flux B, C and filled-up wire A, B, C, D, respectively, belonged to the scope of this invention.

Table 7

| Flux | Chemical composition of submerged arc flux (wt %) | | | | | | | | Basicity B |
|---|---|---|---|---|---|---|---|---|---|
| | $SiO_2$ | CaO | MnO | MgO | $TiO_2$ | $Al_2O_2$ | $CaF_2$ | Others | |
| A | 50 | 30 | — | 7 | — | 4 | 5 | 4 | 0.81 |
| B* | 38 | 22 | 10 | 7 | 4 | 8 | 10 | 1 | 1.00 |
| C* | 32 | 22 | 10 | 13 | 4 | 7 | 7 | 5 | 1.25 |
| D | 30 | 30 | — | 20 | — | 10 | 5 | 5 | 1.57 |

*Flux necessary for this invention.

Table 8

| Electrode Composition (All percentages are by weight based on the weight of the electrode | | | | | | | | | |
|---|---|---|---|---|---|---|---|---|---|
| | A | B | C | D | E | F | G | H | I |
| Calcium fluoride | 15 | 15 | 12 | 6 | 15 | 15 | 15 | 15 | — |
| Magnesium fluoride | — | — | 3 | — | — | — | — | — | — |
| Flux for submerged arc welding listed in Table 7 | — | — | — | — | — | — | — | — | 15 |
| Fe-Si (43% Si) | 0.5 | 0.5 | 0.5 | 0.5 | 0.5 | 0.5 | 0.5 | 0.5 | 0.5 |
| Mn powder | 1.8 | 1.8 | 1.8 | 1.8 | 1.8 | 1.8 | 1.8 | 1.8 | 1.8 |
| Ni powder | 1.5 | — | 1.5 | 1.5 | 1.5 | 1.5 | 1.5 | 1.5 | 1.5 |
| Fe-Mo (60% Mo) | 0.75 | 0.75 | — | 0.75 | 0.75 | 0.75 | 0.75 | 0.75 | 0.75 |
| Fe-Ti (42% Ti) | 0.7 | 0.7 | 0.7 | 0.7 | — | — | — | 0.7 | 0.7 |
| Fe-Zr (20% Zr) | — | — | — | — | 1.4 | — | — | — | — |
| Fe-Al (50% Al) | — | — | — | — | — | — | 0.6 | — | — |
| Fe-Boron (20% boron) | 0.075 | 0.075 | 0.075 | 0.075 | 0.075 | 0.075 | 0.075 | — | 0.075 |
| Iron powder | — | — | — | 15 | — | — | — | — | — |
| Carbon steel sheath | bal. | bal. | bal. | bal. | bal. | bal. | bal. | bal. | bal. |

Electrode diameter: 3.2 mm

EXAMPLE 2

Aluminum killed steels containing Nb and V with the compositions shown in Table 5 were submerged arc welded one layer on both sides. Experimental results of the impact values of the welded metal obtained will be explained.

Figure 2:
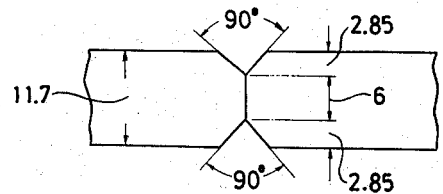
FIG. 2 is a drawing to show the shape of the welding notch.

The size of the master sheet was: 11.7 mm in thickness, 200 mm in width and 400 mm in length. Notches as in FIG. 2 were made by a mechanical working, and the submerged arc welding was carried out under the condition in Table 6. Impact test pieces were taken at the position shown in FIG. 1.

Table 5

| Chemical composition of the steel sheet (%) | | | | | | | | |
|---|---|---|---|---|---|---|---|---|
| C | Si | Mn | P | S | Nb | V | Al | Iron and impurities |
| 0.12 | 0.24 | 1.27 | 0.014 | 0.010 | 0.03 | 0.03 | 0.03 | balance |

Table 6

| Welding condition | | | |
|---|---|---|---|
| Back side | 430 Amp | 35 V | 45 cm/min. |
| Upper side | 600 Amp | 38 V | 45 cm/min. |

In FIG. 3(a) and (b), experimental results on 2 mm V notch Charpy test of the welded metals obtained by the welding with various combinations are shown with the use of the transition curve between absorption energy and temperature.

Samples for curves 1 and 2, whose combinations are respectively flux C and wire D, and flux B and wire A, and curves 7, 8 and 9, whose combinations are respectively flux B and wire B, flux B and wire A, and flux B and wire C, are inventive examples and show very excellent transition curves. Other curves 3, 4, 5 6, 10, 11 and 12 are the transition curves for comparison examples. their combinations being respectively flux D and wire D, flux B and wire H, flux B and wire I, flux A and wire D, flux B and wire F, flux B and wire E, and flux B and wire C.

Among these results, curves 1, 2 and 3 show the influence of the basicity of the flux. It is obvious that, even if the wire satisfies the condition of this invention, the impact value is low when the basicity of the flux is too low (too acidic). Additionally, the welding workability, such as, the appearance and shape of the bead and resistance against pit formation is worse and the impact values are inferior as compared to the inventive combinations when the basicity is high.

In the sample for curve 4, B is not added in the wire while all other conditions are satisfied, and the impact value is low.

The sample for curve 6 does not satisfy the inventive conditions because $CaF_2$ is not added in the filled-up wire, and thus, the results show that the impact value is very low even if the other conditions are satisfied.

Curves 7, 8 and 9 belong to the case of the inventive combination, showing that an excellent impact value can be obtained without the addition of Ni and Mo.

Curves 10, 11 and 12 are to show that no high impact value can be obtained when an element other than Ti, for instance, Zr or Al, is used together with B or B is used alone, and the inventive condition being unsatisfied.

As a reference, the chemical compositions of welded metals in the cases of curves 2 and 5 are shown in Table 9.

As for the cored materials, a slag-forming agent, an arc stabilizer, a deoxidizer, alloy elements and iron, all being within the scope of this invention, can naturally be added besides metal fluorides ($CaF_2$, $MgF_2$, NaF, etc.), Ti and B.

As for the submerged arc flux, fused type ones were used in the above examples. Burnt or sintered type ones may also be applicable in this invention.

As above explained, according to this invention, the welding workability in one layer on both sides— and a small layer heap welding for low-temperature high tension steel, such as, low-temperature aluminum killed steel is excellent, and welded metal with high toughness can be obtained. Its economical effect is very great.

EXAMPLE 3

Aluminum killed steels containing Nb and V with the compositions shown in Table 10 were submerged arc welded in layer on both sides. The experimental results on the impact value of welded metals will be explained below.

Table 9

| | Chemical composition of welded metal (wt.%) | | | | | | | | | |
|---|---|---|---|---|---|---|---|---|---|---|
| | C | Si | Mn | P | S | Ni | Mo | Ti | B | Nb | V |
| Curve 2 Flux B & wire A | 0.07 | 0.34 | 1.50 | 0.013 | 0.018 | 0.66 | 0.25 | 0.02 | 0.003 | 0.02 | 0.03 |
| Curve 3 Flux B & wire I | 0.07 | 0.33 | 1.25 | 0.013 | 0.030 | 0.73 | 0.26 | 0.02 | 0.001 | 0.02 | 0.02 |

Figure 4:
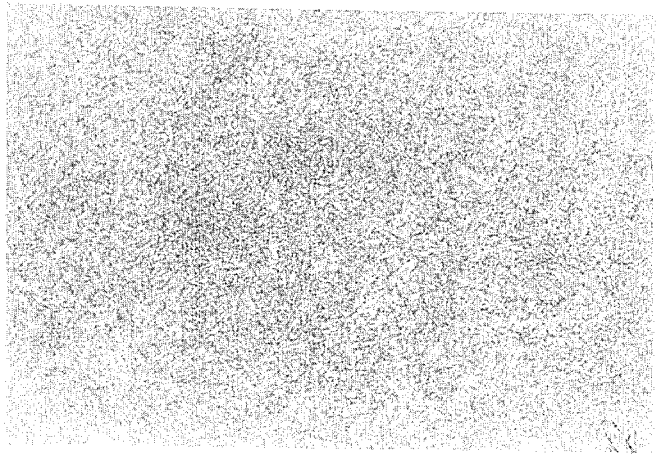
FIG. 4(a) and (b) are the microscopic photographs of the welded metal of the test pieces in the examples of this invention and in the comparison examples.
Figure 4:
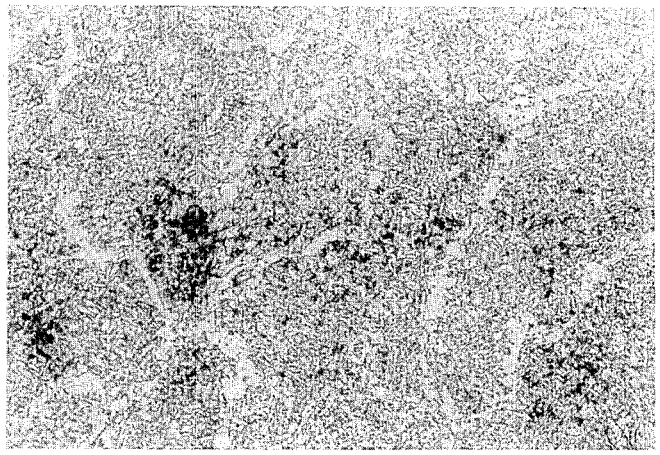

Photographs (a) and (b) in FIG. 4 are the microstructure of welded metal showing the effect of this invention; (a) corresponds to the inventive example in curve 2 of FIG. 3(a), and (b) belongs to the comparison example in curve 5.

In (a), proeutectoid ferrites have almost disappeared and almost no acicular ferrites are observed. The sample consists of fine ferrite crystals, and shows high toughness. In (b), the proeutectoid ferrite grains are large, and its toughness is low.

As for the shape of filled-up wire used in the above experiments, a band-like metal tape was folded in a complicated fashion. However, simple cylindrical and other shapes are, of course, effective for this invention.

While the rate of filling materials in the flux cored wire (filling ratio, in weight %), including iron powder, and others in total, was 18–26% in the above examples, it was ascertained that the manufacture of the wire is possible by using the rate of about 5–50% in general.

The size of the master sheet was 11.7 mm in thickness, 200 mm in width and 400 mm in length. Notches as in FIG. 2 were made by a mechanical working, and the submerged arc welding was carried out under the conditions in Table 11. Impact test pieces were taken at the position shown in FIG. 1.

The welding was carried out under various combinations of six kinds of flux shown in Table 12 with 7 kinds of filled-up wire shown in Table 13. The combinations of submerged arc flux A, B and C with filled-up wires A, B and C are inventive examples (experiments Nos. 1–5).

Table 10

| | | | Chemical composition of the steel sheet | | | | |
|---|---|---|---|---|---|---|---|
| C | Si | Mn | P | S | Nb | Al | Fe and impurities |
| 0.12 | 0.24 | 1.27 | 0.004 | 0.010 | 0.03 | 0.03 | the remainder |

Table 11

| Welding condition | | | |
|---|---|---|---|
| Back side | 430 Amp. | 30–35 volt | 45 cm/min |
| Upper side | 600 Amp. | 32–38 volt | 45 cm/min |

Table 12

| | Chemical components in submerged arc flux (wt.%) | | | | | | | | |
|---|---|---|---|---|---|---|---|---|---|
| Flux | $SiO_2$ | CaO | MnO | MgO | $TiO_2$ | $Al_2O_3$ | $CaF_3$ | Others | Basicity B |
| A* | 30 | 30 | — | 20 | — | 10 | 5 | 5 | 1.57 |
| B* | 34 | 7 | 17 | 8 | 5 | 2 | 25 | 2 | 1.29 |
| C* | 32 | 22 | 10 | 13 | 4 | 7 | 7 | 5 | 1.25 |
| D | 38 | 22 | 10 | 7 | 4 | 8 | 10 | 1 | 1.00 |
| E | 35 | 25 | 8 | 8 | — | 13 | 6 | 5 | 1.04 |
| F | 50 | 30 | — | 7 | — | 4 | 5 | 4 | 0.81 |

*flux necessary for this invention

Table 13

Chemical components in submerged arc wire (wt.%) (projected, as filled-up wire)

|    | Si  | Mn  | Ni  | Mo  | Ti  | Al  | Zr  | B     |
|----|-----|-----|-----|-----|-----|-----|-----|-------|
| A* | 0.2 | 2.0 | 1.5 | 0.5 | 0.2 | —   | —   | 0.020 |
| B* | 0.2 | 2.0 | 1.5 | —   | 0.2 | —   | —   | 0.020 |
| C* | 0.2 | 2.0 | —   | 0.5 | 0.2 | —   | —   | 0.020 |
| D  | 0.2 | 2.0 | 1.5 | 0.5 | —   | 0.3 | —   | 0.020 |
| E  | 0.2 | 2.0 | 1.5 | 0.5 | —   | —   | —   | 0.020 |
| F  | 0.2 | 2.0 | 1.5 | 0.5 | —   | 0   | 0.3 | 0.020 |
| G  | 0.2 | 2.0 | 1.5 | 0.5 | 0.2 | —   | —   | 0.020 |

*wire necessary for this invention

Remarks: Said wires contained iron powder and a slag-forming agent besides above-mentioned components in order to control the rate of the filling material to the total weight of the wire and to stabilize the arc. Si, Ti, Zr, B and other addition elements were used as an iron alloy powder or as a metal powder to obtain a definite composition.

A part of the experimental results on the impact test of the welded metal is shown in Table 14. Combinations Nos. 1, 4, 11 and 12 show the influence of flux basicity, showing that, even when the wire satisfies the condition of this invention, no substantial effect can be obtained when the submerged arc flux does not satisfy the conditions of this invention.

Nos. 1, 2, 3, 6, 7, 8 and 9 show that, even when the flux basicity satisfies the conditions of this invention, a welded metal with high toughness cannot be obtained when the composition of the wire does not satisfy the conditions of this invention.

Combinations Nos. 1, 2 and 3 show also that, only when the conditions of this invention are satisfied, a welded metal with high toughness can be obtained even if the alloy element varies over a wide range, for instance, no Ni or Mo is added.

As a reference, the chemical components in the welded metal in experiments Nos. 1 and 7 are shown in Table 6.

Table 14

Experimental result 2 mm V notch, Charpy value, kg-m (mean value of 3 tests)

| Experiment No. | Flux | Wire | −60°C | −30°C |
|----|---|---|-----|------|
| 1* | A | A | 2.3 | 12.4 |
| 2* | A | B | 6.9 | 11.6 |
| 3* | A | C | 7.1 | 13.2 |
| 4* | B | A | 6.9 | 14.6 |
| 5* | C | C | 5.8 | 10.3 |
| 6  | A | D | 3.5 | 6.8  |
| 7  | A | E | 1.5 | 4.2  |
| 8  | A | F | 2.0 | 4.5  |
| 9  | A | G | 4.6 | 8.2  |
| 10 | C | E | 1.4 | −6.0 |
| 11 | D | A | 2.1 | 6.7  |
| 12 | E | A | 2.5 | 7.0  |
| 13 | E | C | 1.0 | 4.3  |

*combination of this invention

Table 15

Chemical components in the welded metal (wt.%)

| Experiment No. | C | Si | Mn | P | S | Ni | Mo | Ti | B | Nb | V |
|---|---|---|---|---|---|---|---|---|---|---|---|
| 1 Flux A wire A | 0.07 | 0.32 | 1.35 | 0.015 | 0.012 | 0.06 | 0.23 | 0.03 | 0.002 | 0.02 | 0.02 |
| 7 Flux A wire E | 0.07 | 0.30 | 1.38 | 0.013 | 0.014 | 0.52 | 0.23 | <0.01 | 0.002 | 0.02 | 0.02 |

EXAMPLE 4

A steel containing no Nb-V, N-Tuf 33 steel (normalized aluminum killed steel), and an Nb-V steel, a steel having nearly the same components as N-Tuf 33 steel, and also Nb-V, were selected as a steel sheet for the experiment.

The thickness of the sheet was 12 mm for N-Tuf 33 steel, and 11.7 mm for Nb-V steel. The chemical components therein were as shown in Table 16. The welding wires used were as shown in Table 17.

Three submerged arc fluxes, relatively acidic flux A, neutral flux B and highly basic flux C, were used. Their chemical components were as shown in Table 18. They were all of the fused type, and the grain size of the flux was under 20 mesh and contained dust.

The notch was a symmetrical X type with the root surface of 4 mm, and the notch angle was 90° on both sides.

As the welding condition, the backing pass was 500 A, 30–35 V, 45 cm/min. and the finishing pass was 600 A, 32–36, 45 cm/min.

Figure 5:
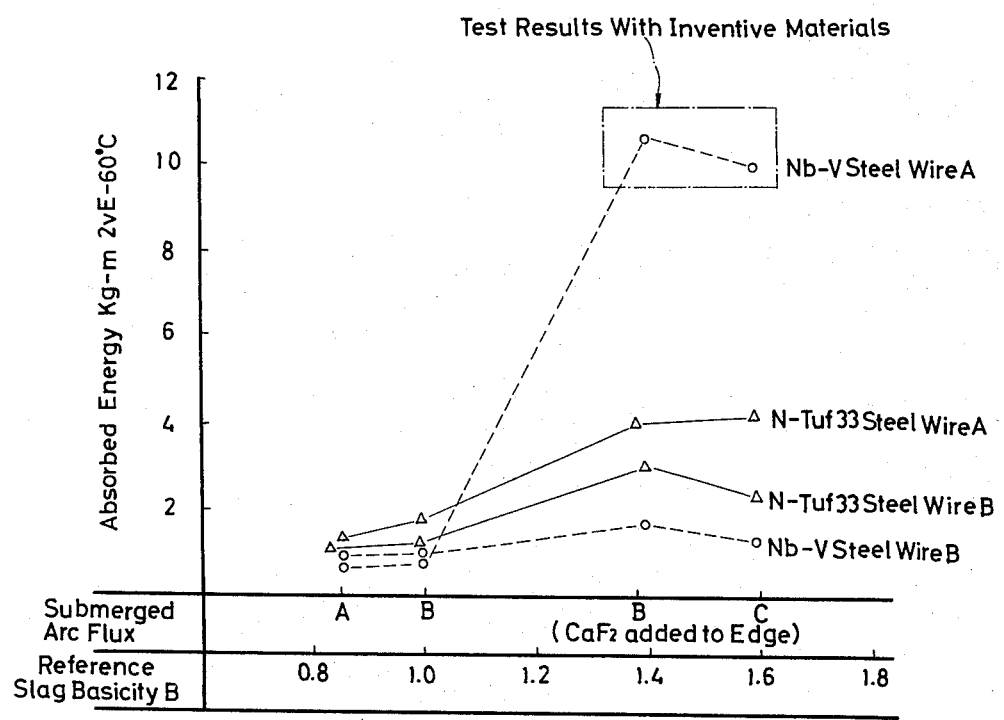
FIG. 5 is a graph showing the absorption energy values of the welded metal in the examples of this invention.

The absorption energy values at −60°C in the 2 mm V notch Charpy test (side notch, whose position was at the center of welded metal and at the center of sheet thickness) of the welded metal obtained by welding with the above-mentioned conditions are shown in FIG. 5.

In Table 19, analytical values of the chemical components in the welded metal and in the slag on the surface of bead (finishing pass side in using wire A for Nb-V steel sheet) are given.

Table 16

Chemical components in the steel sheet applied % chemical components %

|          | C    | Si   | Mn   | P     | S     | Nb   | V    |
|----------|------|------|------|-------|-------|------|------|
| N-Tuff 33| 0.10 | 0.26 | 1.20 | 0.017 | 0.006 | —    | —    |
| Nb-V     | 0.12 | 0.24 | 1.27 | 0.014 | 0.010 | 0.03 | 0.03 |

Table 17

| | Chemical components in the wire applied % chemical components % | | | | | | | | |
|---|---|---|---|---|---|---|---|---|---|
| | C | Si | Mn | P | S | Ni | Mo | Ti | B |
| Wire A | 0.06 | 0.10 | 1.32 | 0.011 | 0.009 | 1.20 | 0.42 | 0.10 | 0.008 |
| Wire B | 0.06 | 0.12 | 1.40 | 0.013 | 0.010 | 1.20 | 0.43 | — | — |

Table 18

| Flux | Chemical components in the submerged arc flux applied Wt.% | | | | | | | | Basicity B |
|---|---|---|---|---|---|---|---|---|---|
| | $SiO_2$ | CaO | MnO | MgO | $TiO_2$ | $Al_2O_3$ | $CaF_2$ | Others | |
| A | 50 | 30 | — | 7 | — | 4 | 5 | 4 | 0.81 |
| B | 38 | 22 | 10 | 7 | 4 | 8 | 10 | 1 | 1.00 |
| C | 30 | 30 | — | 20 | — | 10 | 5 | 5 | 1.57 |

Table 19

| | Chemical components in the welded metal and in the slag % | | | | | | |
|---|---|---|---|---|---|---|---|
| | $CaF_2$ | Si | Mn | Ti | B | Nb | V |
| TA | 15 | 0.2 | 1.8 | 0.3 | 0.015 | 0.06 | 0.06 |
| TB | 15 | 0.2 | 1.8 | 0.3 | 0.015 | — | — |

As it is obvious from these results, when a wire containing no Ti and B (wire B) is used in combination with any flux, the absorption energy value for Nb-V steel is equal to, or lower than the value for N-Tuf 33 steel.

On the contrary, when a wire containing Ti and B (wire A is used, the Nb-V steel shows very high absorption energy value in the range where the slag basicity is high. Thus, it is obvious that by using the materials in this invention, a high toughness can be obtained in the case of the Nb-V steel.

EXAMPLE 5

Another experimental example showing that by using the materials of this invention the impact toughness of the welded metal is improved in the presence of Nb-V is set forth hereinbelow.

The steel sheet used was N-Tuf 33 steel (12 mm in thickness) as in Example 4, and the shape of notch and the welding conditions were also as in Example 4.

As a submerged arc flux, flux B in Example 4 was used.

Two kinds of flux cored wire (3.2 mm in diameter) as shown in Table 20 were used. Wire TA contains $CaF_2$-Si-Mn-Ti-B, and wire TB contains Nb-V in addition to these components.

The impact absorption energy values in 2 mm V notch Charpy test (side notch, whose position was at the center of welded metal and at the center of sheet thickness) of the welded metal by using the two wires are shown in Table 21 together with the chemical components in the slag and the welded metal.

As obvious from these results, the impact toughness is improved by the presence of Nb-V.

While the above experiments were compared for the steel of the Si—Mn system, a similar tendency was obtained when additional elements, such as, Ni, Cr and Mo, were also added. Therefore, it is clear that this invention can be applied to a 60–80 kg/mm² class high tension steel.

It is also clear that this invention can be applied only when the contents of Ti, B and Nb (V) lie within the scope of this invention, for a welded metal of the 50–80 kg/mm² class steel containing other elements, such as, C, Si, Mn, Cu, P, Ni, Cr and Mo.

Trace elements, such as, Al and Zr have no effect on this invention.

As explained above in detail, by using the welding materials of this invention, a welded metal with high toughness can be obtained in the welding of Nb-V steel which gives usually a welded metal with low impact values. Its economical merit is very great.

Table 20

| Wire | Absorption energy | | Chemical components in the welded metal (%) | | | | | | | Chemical components in the slag (%) | | | | | |
|---|---|---|---|---|---|---|---|---|---|---|---|---|---|---|---|
| | −60° | −30° | O | Si | Mn | Ti | B | Nb | V | $SiO_2$ | CaO | MnO | MgO | $TiO_2$ | $Al_2O_3$ |
| TA | 8.3 | 12.2 | 0.07 | 0.30 | 1.45 | 0.04 | 0.004 | 0.03 | 0.02 | 31.9 | 16.9 | 17.3 | 3.1 | 3.4 | 0.9 |
| TB | 3.3 | 8.3 | 0.07 | 0.31 | 1.46 | 0.03 | 0.003 | — | — | — | — | — | — | — | — |

| Wire | $CaF_2$ | FeO | Basicity b |
|---|---|---|---|
| TA | 18.9 | 2.2 | 1.43 |
| TB | — | — | — |

Table 21

| No. | Steel Sheath | Flux | Wire | Additive | Chemical components in the welded metal | | | | | | | | | | |
|---|---|---|---|---|---|---|---|---|---|---|---|---|---|---|---|
| | | | | | C | Si | Mn | P | S | Ni | Mo | Ti | S | Nb | V |
| 1 | | A | A | — | 0.07 | 0.40 | 1.21 | 0.013 | 0.013 | 0.41 | 0.10 | 0.01 | 0.002 | 0.03 | 0.02 |
| 2 | | | B | — | 0.07 | 0.38 | 1.26 | 0.014 | 0.012 | 0.45 | 0.19 | — | — | 0.03 | 0.02 |
| 3 | Nb-V | | A | — | 0.08 | 0.30 | 1.26 | 0.014 | 0.014 | 0.44 | 0.19 | 0.02 | 0.002 | 0.03 | 0.03 |
| 4 | | B | B | — | 0.08 | 0.30 | 1.26 | 0.014 | 0.012 | 0.45 | 0.19 | — | — | 0.02 | 0.02 |
| 5 | | | A | $CaF_2$ added | 0.07 | 0.22 | 1.31 | 0.013 | 0.009 | 0.43 | 0.21 | 0.02 | 0.002 | 0.03 | 0.02 |
| 6 | Steel | B | B | " | 0.08 | 0.24 | 1.32 | 0.013 | 0.010 | 0.42 | 0.22 | — | — | 0.03 | 0.02 |

Table 21 -continued

| No. | Steel Sheath | Flux | Wire | Additive | Chemical components in the welded metal | | | | | | | | | | |
|---|---|---|---|---|---|---|---|---|---|---|---|---|---|---|---|
| | | | | | C | Si | Mn | P | S | Ni | Mo | Ti | S | Nb | V |
| 7 | | C | A | — | 0.10 | 0.22 | 1.25 | 0.013 | 0.008 | 0.42 | 0.19 | 0.01 | 0.002 | 0.03 | 0.03 |
| 8 | | | B | — | 0.10 | 0.020 | 1.27 | 0.012 | 0.008 | 0.45 | 0.20 | — | — | 0.03 | 0.03 |
| 9 | | A | A | — | 0.08 | 0.38 | 1.20 | 0.015 | 0.013 | 0.42 | 0.17 | 0.02 | 0.001 | — | — |
| 10 | | | B | — | 0.08 | 0.38 | 1.24 | 0.015 | 0.013 | 0.43 | 0.19 | — | — | — | — |
| 11 | N-Tuf | | A | — | 0.07 | 0.32 | 1.28 | 0.015 | 0.012 | 0.43 | 0.21 | 0.02 | 0.002 | — | — |
| 12 | | | B | — | 0.09 | 0.31 | 1.30 | 0.015 | 0.012 | 0.46 | 0.20 | — | — | — | — |
| 13 | | | A | CaF₂ added | 0.09 | 0.27 | 1.30 | 0.014 | 0.010 | 0.39 | 0.17 | 0.02 | 0.002 | — | — |
| 14 | 33 Steel | | B | " | 0.08 | 0.28 | 1.35 | 0.015 | 0.011 | 0.41 | 0.18 | — | — | — | — |
| 15 | | C | A | — | 0.10 | 0.25 | 1.27 | 0.015 | 0.009 | 0.48 | 0.20 | 0.01 | 0.002 | — | — |
| 16 | | | B | — | 0.10 | 0.25 | 1.29 | 0.013 | 0.008 | 0.47 | 0.21 | — | — | — | — |

| No. | Steel Sheath | Flux | Wire | Additive | Chemical components in the welded metal basicity b and slag | | | | | | | |
|---|---|---|---|---|---|---|---|---|---|---|---|---|
| | | | | | SiO₂ | CaO | MnO | MgO | Al₂O₃ | CaF2 | FeO | |
| 1 | | A | A | — | 49.5 | 27.1 | 0.6 | 0.9 | — | 4.0 | 4.8 | 4.8 | 0.85 |
| 2 | | | B | — | | | | | | | | |
| 3 | Nb-V | B | A | — | 38.3 | 17.5 | 20.5 | 4.0 | 3.8 | 2.1 | 8.5 | 4.0 | 1.02 |
| 4 | | | B | — | | | | | | | | |
| 5 | | | A | CaF₂ added | 32.1 | 17.0 | 18.2 | 3.0 | 3.1 | 1.4 | 1.5 | 2.5 | 1.32 |
| 6 | Steel | B | B | " | | | | | | | | |
| 7 | | C | A | — | 28.4 | 28.3 | 0.4 | 19.1 | — | 9.0 | 4.5 | 1.3 | 1.60 |
| 8 | | | B | — | | | | | | | | |

What is claimed is:

1. In a method of submerged arc welding to obtain a welded metal with high toughness, the improvement which comprises using in combination:
   a. a submerged arc flux having a nearly neutral composition and having a basicity b as expressed by formula (1) herein in the range from about 0.90 to 1.30, wherein $$b = \frac{CaO+MgO+BaO+Na_2O+K_2O+Li_2O+CaF_2+ \frac{1}{2}(MgO+FeO)}{SiO + \frac{1}{2}(Al_2O_3 + TiO_2 + ZrO_2)}$$

the amounts of the compounds being expressed in weight per cent based on the weight of the flux; and
   b. a wire composed of a hollow-core mild steel sheath, said core being packed with a powdered mixture of about 0.04 to 1.0% by weight titanium, about 0.002 to 0.05% by weight boron, and about 4 to 25% by weight of a fluoride compound selected from the group consisting of $CaF_2$, $NaF_2$, KF, LiF, $M_gF_2$, $MnF_2$, and combinations thereof, all weights being based on the weight of the wire and the balance of the weight of the wire being the steel sheath.

2. The method of claim 1 wherein the welded metal contains up to 3.5% by weight Ni.

3. The method of claim 1 wherein the welded metal contains up to 0.8% by weight Mo.

* * * * *

UNITED STATES PATENT OFFICE
CERTIFICATE OF CORRECTION

Patent No. 3924091        Dated December 2, 1975

Inventor(s) Haruyoshi Suzuki et al

It is certified that error appears in the above-identified patent and that said Letters Patent are hereby corrected as shown below:

In the heading of the Letters patent [75] and [30] should read as follows:

-- [75]   Haruyoshi Suzuki, Tokyo;
         Tsuyoshi Takino, Chiba-ken;
         Naomichi Mori, Tokyo;
         Isao Sugioka, Chiba-ken;
         Osamu Matsuda, Chiba-ken;
         Shozo Sekino, Fukuoka-ken;
         Hiroyuki Honma, Tochigi-ken,
         all of Japan--.

-- [30]   Aug. 12, 1970   Japan...............45-71058
         Sept. 29, 1970   Japan...............45-84613
         Aug. 14, 1970   Japan...............45-71575
         Dec. 10, 1970   Japan...............45-109847--.

Signed and Sealed this sixteenth Day of March 1976

[SEAL]

Attest:

RUTH C. MASON
*Attesting Officer*

C. MARSHALL DANN
*Commissioner of Patents and Trademarks*